Figure 1:
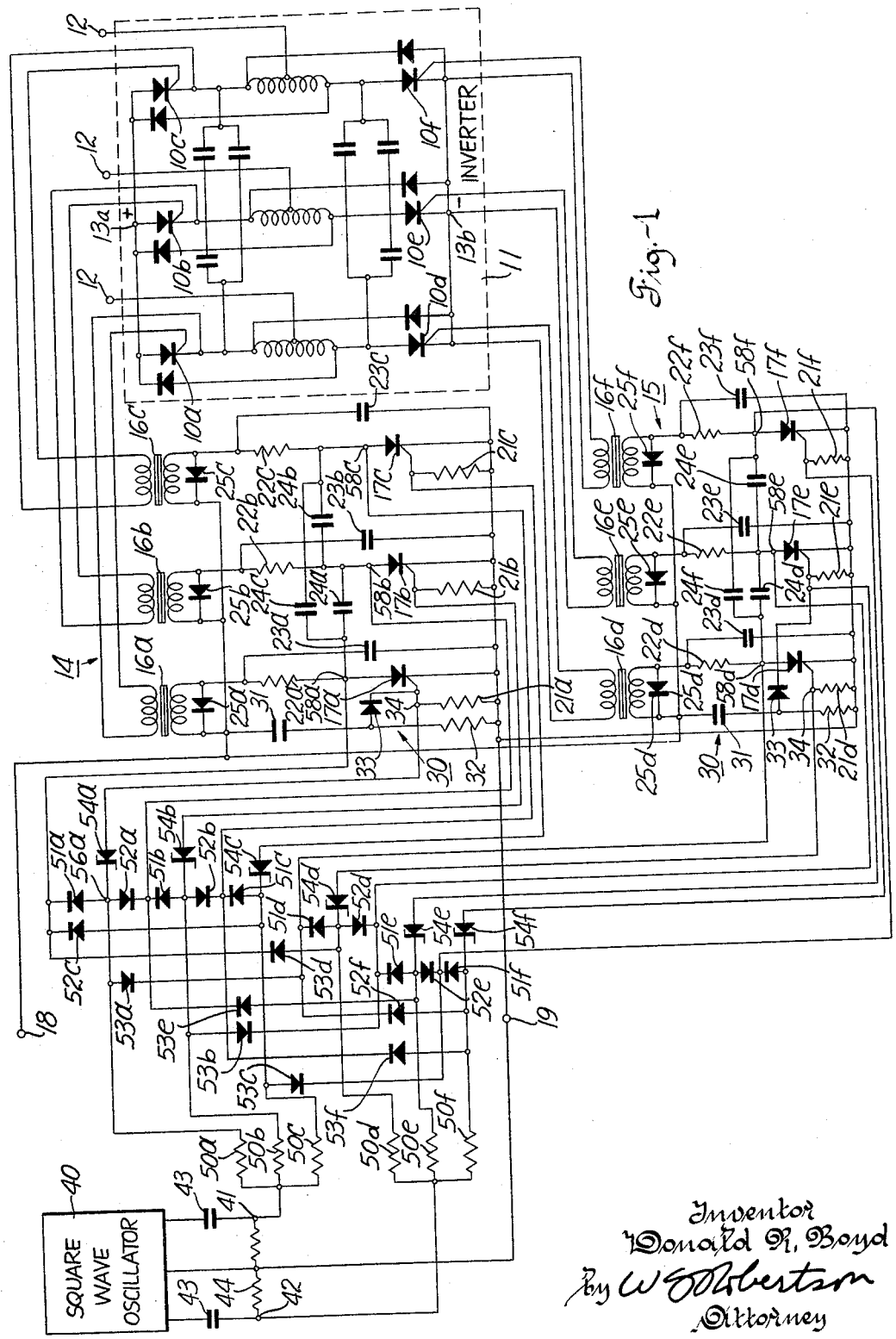

Inventor
Donald R. Boyd
By W. J. Robertson
Attorney 3,264,489
INVERTER GATING CIRCUIT
Donald R. Boyd, Waukesha, Wis., assignor to Allis-Chalmers Manufacturing Company, Milwaukee, Wis.
Filed Oct. 23, 1962, Ser. No. 232,459
7 Claims. (Cl. 307—88.5)

This invention relates generally to semiconductor circuits. More specifically this invention relates to a circuit for sequentially gating controlled rectifiers in an inverter.

An inverter provides alternating current from a direct current source. Considered from a rather elementary standpoint, an inverter connects the alternating current load terminals to the direct current source terminals for a half period in one polarity and it then reverses the connection for the next half period to provide an alternating voltage across the load. Several well known inverter circuits make these connections by means of two semiconductor switch devices for each line of the alternating current system. One switch device in each pair connects its load terminal to one polarity of the source and the other switch device connects this load terminal to the other source terminal. A three phase inverter can have six controlled rectifiers that are turned on in a sequence that maintains each controlled rectifier conducting for one-third of each cycle. One of the problems of an inverter is to provide means for turning on the appropriate controlled rectifiers at the preselected point in the alternating current cycle.

One common use for an inverter is to supply a variable frequency to drive a frequency responsive device such as an induction motor. Such inverters usually have a variable frequency oscillator that provides a reference for turning on the controlled rectifiers. The requirement to gate the controlled rectifier in response to a frequency reference is a further problem in such an inverter.

The inverter gating circuit of this invention has a circuit of controlled rectifiers or other devices that remain conducting once they are turned on. In the gating circuit of this invention each controlled rectifier is connected so that when it is turned on, it gates an associated switch device in the inverter, turns off the off-going controlled rectifier of the gating circuit and remains conducting to establish a circuit that controls which controlled rectifier can be turned on next. An oscillator, which may have a variable frequency, provides gating pulses for the controlled rectifiers of the gating circuit.

One advantage of this circuit is that a circuit of diodes establishes the sequence of turning on the controlled rectifiers, and two arrays of diodes can be provided easily to provide for switching from one phase rotation direction to the other.

One object of this invention is to provide a new and improved inverter.

Another object of this invention is to provide a new and improved gating circuit for a static inverter.

The drawing and the detailed description of the invention will suggest other objects and advantages of the invention.

Figure 2:
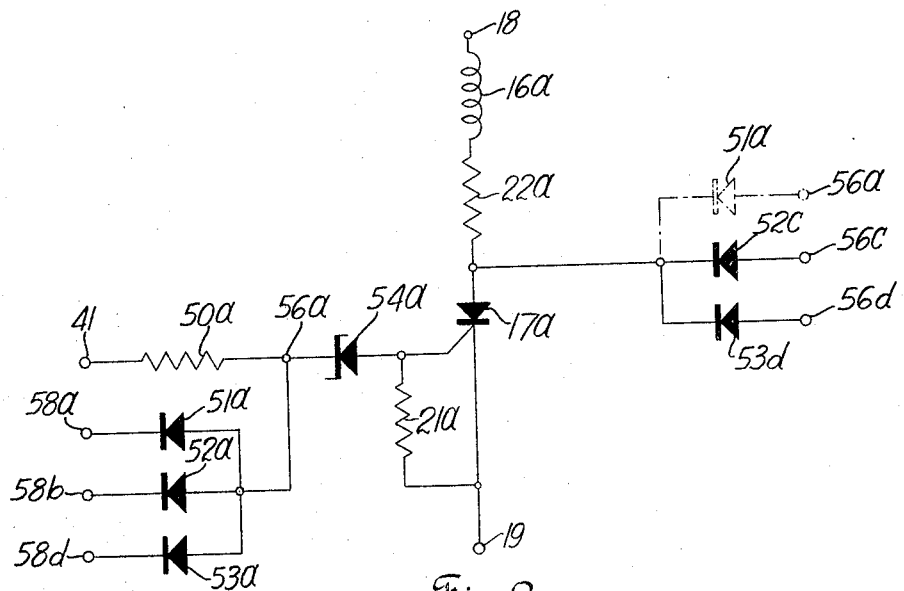
Figure 3:
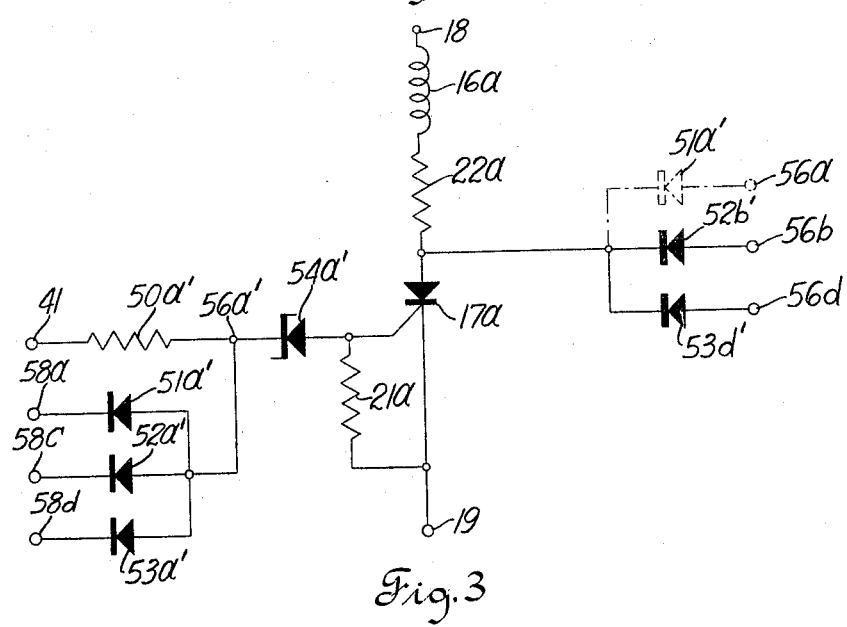

In the drawing:
FIG. 1 shows one embodiment of the gating circuit of this invention and an inverter that is connected to be gated by this circuit;
FIG. 2 shows a portion of the gating circuit of FIG. 1; and
FIG. 3 illustrates a portion of the circuit of FIG. 1 connected to establish the opposite direction of phase rotation.

The specific circuit that will be described is intended to gate the controlled rectifiers 10 of an inverter 11 (well known). The six controlled rectifiers 10 of inverter 11 are suffixed *a* through *f*, and corresponding elements of the gating circuit have the same suffixes. Controlled rectifiers 10 are connected to energize the conductors 12 of a three phase system from a direct current source having a positive terminal 13*a* and a negative terminal 13*f*. Three of the controlled rectifiers 10*a*, 10*b*, and 10*c* can be controlled to connect conductors 12 to the positive terminal 13*f* and three controlled rectifiers 10*d*, 10*e*, and 10*f* can be controlled to connect conductors 12 to the negative terminal 13*b*. One suitable sequence for turning on controlled rectifiers 10 is to initially gate one selected controlled rectifier of each polarity group (e.g., 10*a* and 10*e*), and then to gate another controlled rectifier of first one polarity group and then the other. As a controlled rectifier 10 in one group is turned on, it cooperates with other circuit elements to turn off the previously conducting controlled rectifier 10 of that group.

The gate-cathode circuit of each controlled rectifier 10 is coupled to a stage of one of two three bit rings 14 and 15 by means of a transformer 16. Each stage of rings 14 and 15 has a controlled rectifier 17 that can be turned on (as will be explained later) to connect the primary winding of transformer 16 across the terminals 18 and 19 which are understood to be connected to a direct current source. A capacitor 24 connects the anode terminal of one controlled rectifier 17 to the anode terminal of the next controlled rectifier 17 in the turn on sequence of each ring 14, 15 for commutation. A diode 25 is connected across one of the windings of transformer 16 in the proper polarity to suppress the negative voltage at the gate terminal of a controlled rectifier 10 when controlled rectifier 17 turns off. A resistor 21 is connected between the gate terminal and the cathode terminal of controlled rectifier 17 to help turn off controlled rectifier 17. Each stage also includes an anode resistor 22 and a capacitor 23 that are connected to shape the voltage wave form across the windings of transformer 16.

*The starter circuit*

A suitable network 30 is provided to turn on a selected stage of each ring when the circuit is connected to the source. Network 30 comprises a capacitor 31 and a resistor 32 connected in series across terminals 18, 19 so that an exponentially decaying voltage spike appears across resistor 32 when the circuit is first energized; and a diode 33 connects the common terminal 34 of capacitor 31 and resistor 32 to the gate terminal of the selected controlled rectifiers 17*a* and 17*e*. Diode 33 isolates the gate terminals from capacitor 31 and resistor 32 after the starting pulse. When the gating circuit is deenergized, capacitor 31 discharges in a circuit that may comprise a resistor (not shown) connected across terminals 18, 19. Preferably, each ring 14 and 15 has an independent starting circuit 30.

*The oscillator*

A suitable square wave oscillator 40 provides two gating pulses between a common connection to the negative terminal 19 of the rings 14, 15 and first and second output terminals 41, 42. The oscillator provides a positive polarity gating pulse at first one output and then the other. The oscillator preferably comprises a bistable flip flop that is triggerd by means of a relaxation oscillator having a unijunction transistor (well known). A capacitor 43 and a resistor 44 are connected to points 41, 42 to provide voltage spikes of the desired width in response to the positive going edge of the square wave.

*The pulse steering circuit*

The gating pulse at either output 41, 42 of the oscillator is steered to the selected stage of the two rings 14, 15 by a maze of resistors 50, diodes 51, 52, 53, and zener diodes 54. The two controlled rectifiers that are turned on bias the diodes to block the pulses from all but one selected stage of the two rings. FIG. 2 shows a controlled rectifier 17a, the connections to the oscillator and to the other controlled rectifiers for gating or not gating this stage, and the connections from the anode terminal of this stage to the gating circuits that are controlled by this stage. The identifying characters of diodes 51, 52, 53 are suffixed according to the suffix of the associated gate terminal. Each stage biases one diode 51 that prevents the next pulse from reaching this stage. In FIG. 2 diode 51 is shown in its gate connection and is also shown by dot-dashed lines in its anode connection. Each stage biases one diode 52 that is connected to prevent turning on the preceding controlled rectifier 17 in the sequence of the same polarity group. Each stage also biases one diode 53 that is connected to prevent turning on one controlled rectifier in the other polarity group to establish which polarity group can receive the next pulse from oscillator 40.

A resistor 50 and a zener diode 54 connect the gate terminal to oscillator output terminal 41. Zener diode 54 is polarized to conduct in its reverse direction only if the positive pulse at its cathode terminal is above the breakdown voltage. The diodes 51a, 52a, 53a are connected to maintain the cathode terminal of zener diode 54a below the breakdown voltage when any selected controlled rectifier (17a, 17b, 17d) is turned on. A resistor 50a isolates the potential at the common connection 56a of diodes 51a, 52a, 53a and zener diode 54a from the potential at oscillator terminal 41.

When controlled rectifier 17a is turned off, the cathode connection 58a of diodes 51a, 52c, 53d is at the positive potential of the source. The gating pulse at terminals 41, 42 is made less positive than positive terminal 18, so that diodes 51a, 52c, 53d are turned off when controlled rectifier 17a is turned off. Similarly, when diodes 51a, 52a, and 53a are all turned off (i.e., controlled rectifiers 17a, 17b and 17d are all off) a positive pulse at terminal 41 turns on zener diode 54a and gates controlled rectifier 17a.

When controlled rectifier 17a is gated, terminal 58a and the cathodes of diodes 51a, 52c, 53d have substantially the potential of negative terminal 19. Diodes 51a, 52c would turn on in response to a positive gating pulse at terminal 41 and diodes 54, 53d would turn on in response to a positive gating pulse at terminal 42.

The diode array shown in FIGS. 1 and 2 establishes the following sequence for turning on the controlled rectifiers: A and E, A and F, B and F, B and D, C and D, C and E. FIG. 3 shows an array of diodes generally similar to FIG. 2 except that the diodes are connected to establish the reverse phase rotation. Preferably, the gating circuit has an array of diodes for each direction of phase rotation. In FIG. 3 the elements not shown in FIG. 1 are indicated by a prime on the identifying character. The diode array illustrated in FIG. 3 can be connected permanently to controlled rectifiers 17 as FIG. 3 shows, and the oscillator output 41, 42 can be switched between the two circuits that are illustrated by FIGS. 2 and 3.

Operation

Before the circuit is connected to be energized by the source, the capacitors 23, 24, 31 are all discharged. When the circuit is connected to the source, and oscillator 40 is energized, each capacitor 31 charges in series with its resistor 32 and the positive potential at terminal 34 turns on diodes 33 and gates controlled rectifiers 17a and 17e. When controlled rectifiers 17a, 17e turn on, they produce voltage pulses across the transformers 16a, 16e that gate controlled rectifiers 10a, 10e of the inverter, and they charge capacitors 24a and 24e with terminals 58a and 58e negative and terminals 58b and 58f positive. Controlled rectifier 17a puts a low positive potential (negative with respect to a pulse at oscillator terminals 41, 42) at the cathode terminals of diodes 51a, 52c and 53d to prevent the first gating pulse from turning on controlled rectifiers 17c or 17d and from regating controlled rectifier 17a. Controlled rectifier 17e similarly blocks the gating circuit to controlled rectifiers 17b, 17d, and 17e. When oscillator 40 produces a positive pulse first at terminal 41, the pulse turns on diodes 51a, 53b and 52c, and the voltage of the pulse at terminal 41 appears across the resistors 50a, 50b and 50c and the potential at the cathode terminals 56a, 56b, and 56c of zener diodes 54a, 54b and 54c remains below the breakdown voltage and prevents the pulse from turning on any of the controlled rectifiers 17a, 17b and 17c, of ring 14. When the positive output pulse of the oscillator appears at terminal 42, it turns on diodes 52d, 53d, and 51e, which prevent zener diodes 54d and 54e from conducting to gate controlled rectifiers 17d or 17e. Thus, the gating potential at the output 41 appears at the cathode terminal of zener diode 54f and turns on zener diode 54f and gates controlled rectifier 17f.

When controlled rectifier 17f turns on, it produces a voltage pulse across the windings of transformer 16f, and it connects the positively charged terminal 58f of capacitor 24e to the common negative terminal 19 of ring 15. Thus, the charge across capacitor 24e appears across the cathode-anode terminals of controlled rectifier 17e in the reverse polarity and turns off controlled rectifier 17e. When controlled rectifier 17e turns off, it removes the negative potential at the cathode of diode 53b and thereby establishes a circuit to gate controlled rectifier 17b next. The capacitors 24 are made large enough to maintain the reversed potential across the anode-cathode terminals of controlled rectifier 17 long enough that the gating pulse that turned on controlled rectifier 17f will not turn on controlled rectifier 17e again. When controlled rectifier 17f turns on, it produces a negative potential at the cathode terminal of the appropriate diodes 51f, 52e and 53c to prevent the next pulse from turning on controlled rectifiers 17c, 17e or from regating controlled rectifier 17f.

Those skilled in the art will recognize variations in the single embodiment of the invention that has been described, and the claims are intended to cover a variety of circuits within the spirit of the invention.

Having now particularly described and ascertained the nature of my said invention and the manner in which it is to be performed, I declare that what I claim is:

1. A gating circuit for the type of inverter having a first group of controlled switch devices associated with one polarity of a direct current source and a second group of controlled switch devices associated with a second polarity of the source, said gating circuit comprising, a plurality of semiconductor devices each having input terminals and output terminals, said output terminals being connected to turn on said controlled switch devices in response to the potential at said output terminals, an oscillator for producing a series of pulses to turn on said semiconductor devices, voltage responsive circuit means for each of said semiconductor means connecting said oscillator to said input terminals, each said circuit means being connected to selected ones of said output terminals to establish a conductive path between said oscillator and the input terminals of only a selected one of said semiconductor devices according to the conduction state of all of said semiconductor devices, and means interconnecting said output terminals whereby an on-coming semiconductor device turns off the off-going semiconductor device in a preset sequence.

2. A gating circuit for the type of inverter having a first group of controlled switch devices associated with one polarity of a direct current source and a second group of controlled switch devices associated with a second polarity of the source, said gating circuit comprising, a first polarity group and a second polarity group of controlled rectifiers, one controlled rectifier for each controlled switch device in the inverter, and means for connecting said controlled rectifiers to turn on the switch devices in the inverter according to the state of said controlled rectifiers, an oscillator for producing a series of pulses to turn on said controlled rectifiers, commutating means interconnecting the controlled rectifiers of each group whereby an on-coming controlled rectifier turns off the off-going controlled rectifier in its group, circuit means for each controlled rectifier connecting its gate terminal to the output of said oscillator, and voltage responsive means in said circuit means for transmitting a gating pulse to its associated controlled rectifier only in response to a predetermined voltage at a point in said circuit means, said circuit means including means isolating the potential of said points from the corresponding points in the circuit means of the other controlled rectifiers, means connecting the anode terminals of each of said controlled rectifiers to selected ones of said points to establish selected controlled rectifiers that cannot be gated when a given controlled rectifier is turned on, and means for gating a selected controlled rectifier in each group to start the inverter.

3. A gating circuit for a three phase inverter having a first group of three controlled switch devices associated with one polarity of a direct current source and having a second group of three controlled switch devices associated with the other polarity of the source, said gating circuit comprising, a first polarity group of three controlled rectifiers and a second polarity group of three controlled rectifiers, each of said controlled rectifiers being connected to control one of the switch devices in the inverter, an oscillator providing a series of pulses to turn on said controlled rectifiers, commutating means interconnecting said three controlled rectifiers in each group whereby an on-coming controlled rectifier turns off any other conducting controlled rectifier in its group, voltage responsive means connecting the gate terminal of each controlled rectifier to the output of the oscillator only when a terminal of said voltage responsive means is at a predetermined voltage, and means for isolating the potential of each said terminal from the terminals of each other of said voltage responsive means, means connecting a terminal of each controlled rectifier to a terminal of said voltage responsive means of other controlled rectifiers to prevent gating a conducting controlled rectifier, the preceding controlled rectifier in the gating sequence in the same polarity group, or the corresponding controlled rectifier of the opposite polarity group, and means for gating two of said controlled rectifiers to start said inverter.

4. A gating circuit for the three phase inverter of the type having a first group of three controlled switch devices associated with one polarity of a direct current source and having a second group of three controlled switch devices associated with the other polarity of the source, said gating circuit comprising, a first polarity group of three controlled rectifiers and a second polarity group of three controlled rectifiers, each of said controlled rectifiers connected to control one of the switch devices in said inverter, an oscillator producing a series of pulses to turn on said controlled rectifiers, voltage responsive circuit means connecting the gate terminal of each controlled rectifier to the output of the oscillator for transmitting a pulse to a gate terminal only in response to a predetermined voltage at a point in said circuit means, means in said circuit means isolating the potential of said point from corresponding points in the other of said circuit means, means including diodes connecting the anode terminal of each controlled rectifier to said point in said circuit means of selected controlled rectifiers to prevent gating a conducting controlled rectifier, the preceding controlled rectifier in the sequence in the same polarity group, or the corresponding controlled rectifier of the opposite polarity group, and commutating means interconnecting said three controlled rectifiers in each group of controlled rectifiers whereby an on-coming controlled rectifier in each group turns off any other conducting controlled rectifier in its group.

5. A gating circuit for a three phase inverter having a first group of three controlled switch devices associated with one polarity of a direct current source and having a second group of three controlled switch devices associated with the other polarity of the source, said gating circuit comprising, a first polarity group of three controlled rectifiers and a second polarity group of three controlled rectifiers, each of said controlled rectifiers being connected to control a switch device in the inverter, an oscillator producing a pulse alternately at first and second terminals to turn on said controlled rectifiers, circuit means connecting the gate terminal of each controlled rectifier of said first group to said oscillator first terminal and connecting the gate terminal of each controlled rectifier of said second group to said oscillator second terminal, said circuit means including voltage responsive means for each said controlled rectifier for transmitting a pulse to a gate terminal only in response to a predetermined voltage at a terminal of said voltage responsive device, means in said circuit means isolating the potential of said terminal from other of said terminals in said circuit means, means including diodes connecting the anode terminal of each controlled rectifier to selected ones of said terminals in said circuit means to prevent gating either a conducting controlled rectifier or the preceding controlled rectifier in the sequence in the same polarity group, and commutating means interconnecting said three controlled rectifiers in each group whereby an on-coming controlled rectifier turns off any other conducting controlled rectifier in its group.

6. A gating circuit for a three phase inverter having a first group of three controlled switch devices associated with one polarity of a direct current source and having a second group of three controlled switch devices associated with the other polarity of the source, said gating circuit comprising, a first polarity group of three controlled rectifiers and a second polarity group of three controlled rectifiers, each of said controlled rectifiers being connected to control a corresponding switch device in the inverter, an oscillator for producing pulses to turn on said controlled rectifiers, commutating means interconnecting said three controlled rectifiers in each group of controlled rectifiers whereby any on-coming controlled rectifier turns off any other conducting controlled rectifier in its group, said commutating means including a capacitor and a resistor connected to prevent an off-going controlled rectifier from being turned on in the same cycle of the oscillator frequency, circuit means connecting the gate terminal of each controlled rectifier to the output of said oscillator, said circuit means including voltage responsive means for transmitting a pulse to the gate terminals only in response to a predetermined voltage at a point in said circuit means, and means in said circuit means isolating the potential of said point from the output of said oscillator, means including diodes connecting the anode terminal of each controlled rectifier to said point in the circuit means of selected controlled rectifiers to prevent gating a conducting controlled rectifier, the preceding controlled rectifier in the sequence in the same polarity group or the corresponding controlled rectifier of the opposite polarity group, and means for gating two of said controlled rectifiers to start said inverter.

7. A gating circuit for the three phase inverter of the type having a first group of three controlled switch devices associated with one polarity of a direct current source and having a second group of three controlled switch devices associated with the other polarity of the source, said gating circuit comprising, a first polarity group of three controlled rectifiers and a second polarity group of three controlled rectifiers, each of said controlled rectifiers connected to control one of the switch devices in the inverter, an oscillator producing a series of pulses to turn on said controlled rectifiers, circuit means for each said controlled rectifier connecting its gate terminal to the output of said oscillator, said circuit means including voltage responsive means for transmitting a pulse to a gate terminal only in response to a predetermined voltage at a point in said circuit means, means in said circuit means isolating the potential of said point from corresponding points in the other of said circuit means, means including diodes connecting the anode terminal of each controlled rectifier to said point in said circuit means of selected controlled rectifiers to prevent gating a conducting controlled rectifier, the preceding controlled rectifier in the sequence in the same polarity group, or the corresponding controlled rectifier of the opposite polarity group, commutating means interconnecting said three controlled rectifiers in each group whereby an oncoming controlled rectifier in each group turns off any other conducting controlled rectifier in its group, said commutating means including for each controlled rectifier a capacitor connecting its anode terminal to the anode terminal of the next controlled rectifier in the gating sequence in the same polarity group and including a capacitor and a resistor connected to shape the voltage wave at said anode terminal to prevent the off-going controlled rectifier from being turned on in the same cycle of said oscillator in which it has been turned off, and means for gating two of said controlled rectifiers to start said inverter.

No references cited.

ARTHUR GAUSS, *Primary Examiner.*

J. BUSCH, *Assistant Examiner.*